US006941370B2

(12) United States Patent
Boies et al.

(10) Patent No.: US 6,941,370 B2
(45) Date of Patent: Sep. 6, 2005

(54) DYNAMIC PROXY RECONFIGURATION SYSTEM AND METHOD TO SUPPORT SHARING OF EXTRA CAPACITY

(75) Inventors: Stephen J. Boies, Mahopac, NY (US); Samuel Dinkin, Austin, TX (US); Paul Andrew Moskowitz, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 09/742,571

(22) Filed: Dec. 20, 2000

(65) Prior Publication Data

US 2002/0078206 A1 Jun. 20, 2002

(51) Int. Cl.[7] .............................. G06F 15/173
(52) U.S. Cl. ...................... 709/226; 709/223
(58) Field of Search ............... 709/223, 226, 709/229, 219; 705/26; 455/436; 707/203

(56) References Cited

U.S. PATENT DOCUMENTS

| 5,935,249 A | * | 8/1999 | Stern et al. ................. 713/201 |
| 6,154,211 A | * | 11/2000 | Kamachi et al. ............. 345/419 |
| 2002/0133412 A1 | * | 9/2002 | Oliver et al. ................. 705/26 |

FOREIGN PATENT DOCUMENTS

| JP | 11-032085 | * | 2/1999 | ........... H04L/12/56 |

OTHER PUBLICATIONS

"Should the Internet be like McDonalds?", 1997, Nikkei Business Publications.*
"The Grid: International Efforts in Global Computing", Baker et al. Jul. 2000.*
"An Economy Driven Resource Management Architecture for Global Computational Power Grids", Buyya et al, 2000.*
"Setting up your own DNS", Kessler, Mar. 1996.*
Proceedings of the 19th International Conference for the Management and Performance ☐☐Evaluation of Enterprise Computing Systems. "Client server capacity planning challenges", ☐☐Major, Joseph B. 1994.*
"WebOS: Operating system services for wide area applictions", Vahdat et al. 1998.*
"Value added IP Services in a Wholesale Environment." Cosine Communications, 1998.*

* cited by examiner

*Primary Examiner*—John Follansbee
*Assistant Examiner*—Chad Zhong
(74) *Attorney, Agent, or Firm*—Buckley, Maschoff & Talwalkar LLC; Stephen C. Kaufman

(57) ABSTRACT

A method directed to a dynamic proxy reconfiguration which is implemented in plural network servers. The invention is directed to a computer-executable program for use in proxy network servers which enables each proxy server to dynamically sell its unused capacity to other web sites for specific periods of time. The invention has particular utility in connection with World Wide Web servers, but can be used with other servers where proxy servers may be present.

19 Claims, 8 Drawing Sheets

DYNAMIC PROXY RECONFIGURATION SYSTEM AND METHOD TO SUPPORT SHARING OF EXTRA CAPACITY

FIELD OF THE INVENTION

The invention generally relates to a system and method for dynamically reconfiguring proxy server networks so that they may share extra capacity.

BACKGROUND

Network systems, such as the internet and, more specifically, the World Wide Web ("WWW"), utilize servers to process requests for information. However, with increased popularity, these network systems are gradually becoming more overloaded since the number of requests for information has been sharply increasing. When a server becomes overloaded, it may be unable to receive new requests, may be slow to process the requests it has already received, and may yield server errors.

On the WWW, such overloading can be extremely detrimental. As web browsers have become the primary interface for access to many network and server services, more businesses have begun using the WWW to market their products or for advertising purposes. To these businesses, prompt and efficient access to their sites is extremely desirable, as it is well known that WWW users tend to avoid sites which load slowly or yield server errors.

However, when a popular web page is hosted by a single computer or server, the internet traffic to the computer can be overwhelming. To address this situation, a number of server-based solutions have been proposed and/or implemented to attempt to ensure that Internet services remain available, scalable and well-balanced. One of the most popular solutions has been the use of load balancing, which involves distributing requests among servers (e.g., different servers on a WWW site) in order to ensure that any one server does not become unduly burdened.

One conventional load balancing technique involves the use of a domain name server (hereinafter "DNS"). This device is responsible for resolving uniform resource locators or "URLs" (e.g., "www. .com") to specific IP addresses (e.g., 111.222.111.222). In this regard, a Web site having several servers may operate under a single URL, although each server is assigned a different IP address. It is up to the DNS to determine which server to route a web user to when a request is made. For example, a round-robin DNS performs load balancing by routing requests to these servers in sequential rotation based on their IP addresses.

When a web site has several servers operating under the same URL, those extra servers are often called "proxy" or "mirror" servers. The proxy server stores exactly the same web site information found in the originating server. Thus, when a user makes a request to visit a website that uses a proxy server, the user will see the same exact website whether or not the user is visiting the proxy server or the original server.

As the need for proxy services has increased, some companies have begun to operate their own proxy networks for the purpose of delivering content for certain subscriber WWW sites. However, the agreements these proxy network providers have with the subscriber WWW sites is generally long-term in nature. Thus, the proxy networks are generally configured for the maximum expected traffic at the subscribed WWW sites and there is often unused capacity on the proxy network being wasted. What is needed is a method to let the proxy network dynamically sell the extra capacity so that it is not wasted.

SUMMARY

The system and method is directed to dynamic proxy reconfiguration implemented in interconnected network servers. In particular, the invention is directed to a computer-executable program for use in proxy network servers which enables each proxy server to dynamically sell its unused capacity to other web sites for specific periods of time. The invention has particular utility in connection with World Wide Web servers and proxy servers, but can be used with other servers where proxy servers may be present, such as CORBA servers, ORB servers, FTP servers, SMTP servers, and Java servers. The system and method may be used to dynamically sell extra capacity to other websites to make additional profit.

In a preferred embodiment, a proxy server network monitors its servers to determine whether any unused capacity exists. If any unused capacity exists, the proxy server can sell an estimated or set amount of unused capacity for a set amount of time through various market mechanisms to web site server operators.

Once a purchaser has been identified, a controller program either on the domain name server of the proxy network or on a separate server connected to the proxy server network ensures that the proxy network's domain name server receives information on the purchaser website. This information includes the name to address map of the purchaser web site network and the content of those websites which will be stored for the purchased period of time on the proxy servers.

After this information is stored on the domain name server of the proxy server network, the domain name server of the proxy server network can begin mapping a fraction of the overall mapping requests to the proxy servers. The overall fraction of requests mapped by the domain name server will depend on the initial agreement between the proxy network and the purchaser. For example, if the unused proxy capacity was determined based on an estimate of extra capacity available, the proxy network might service the purchaser website's mapping requests using its best efforts for the time it agreed to provide proxy server capacity to the purchaser. In such a case, the final bill due the proxy server network will be based on the purchaser website's actual usage of the proxy server capacity.

The remaining fraction of mapping requests which the proxy server network does not handle are routed back to the purchaser website's servers for mapping. However, if the purchaser supplied the controller program with an assignment algorithm, the domain name server of the proxy server network will route the remaining mapping requests to servers in the purchaser website's network.

DETAILED DESCRIPTION OF THE PREFERRED EMBODIMENTS

The system and method is directed to reconfiguring proxy network servers so that proxy networks can dynamically sell unused capacity to other networks for specific periods of time. This unused capacity can be used for delivering content normally found on the purchaser's network, so that the overall load on the purchaser network is reduced. Although the system and method will be described in the context of the WWW, and more specifically the content of WWW servers, it is not limited to use in this context. Rather, the system and method can be used in a variety of different types of networking systems with a variety of different servers. For example, the system and method can be used in intranets and local area networks, and with CORBA servers, ORB servers, FTP servers, SMTP servers, and Java servers, to name a few.

Figure 1:
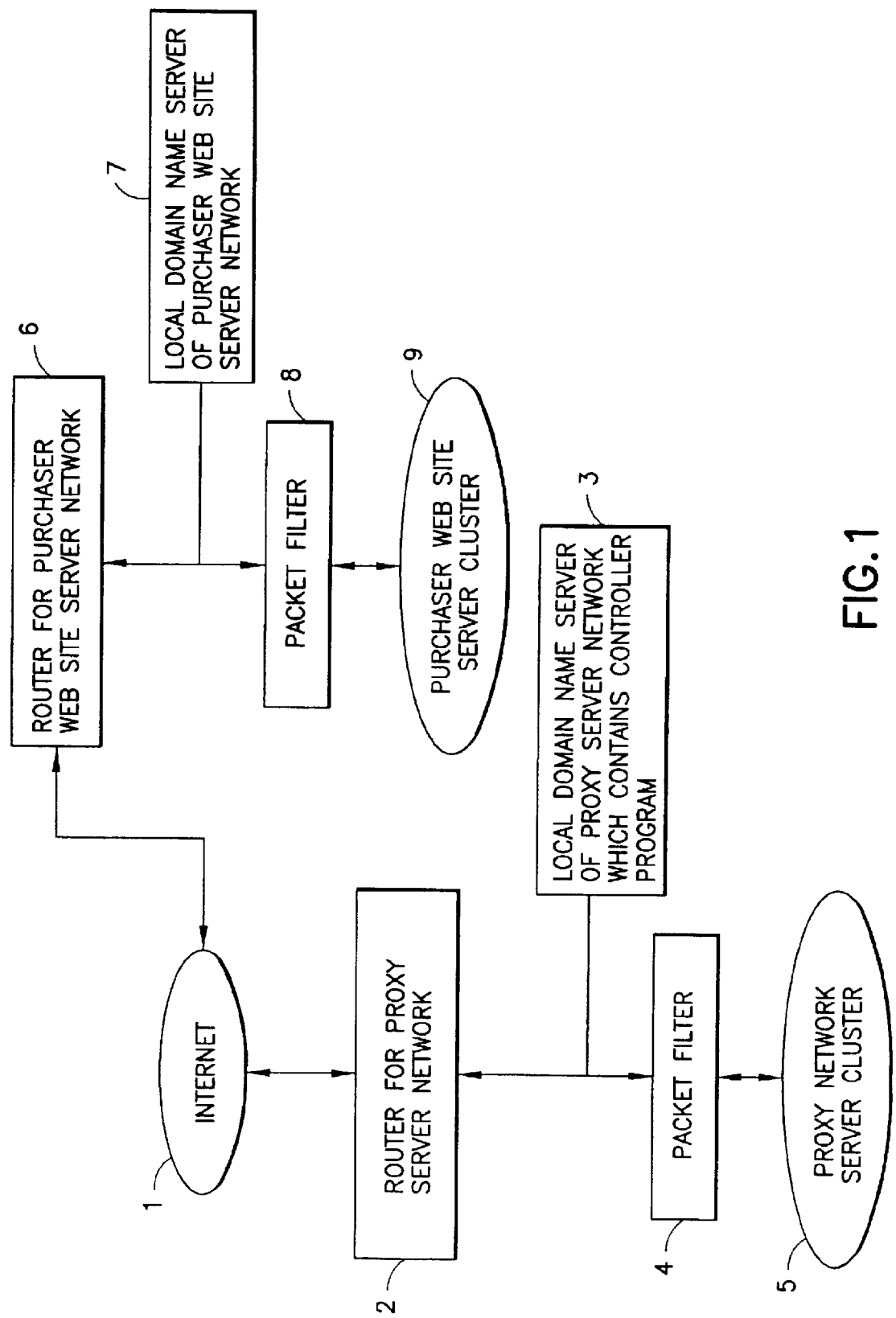
FIG. 1 is a hardware diagram illustrating the data flow of the preferred embodiment for the system and method to let a proxy network dynamically sell unused capacity.

FIG. 1 is a basic hardware diagram of a networking system capable of carrying out the processing in accordance to one embodiment of the system and method. More specifically, FIG. 1 depicts the topology of a website network and proxy network and how they connect to the internet and to each other. FIG. 1 shows a proxy network's connections to the internet consisting of a proxy network server cluster 5, a packet filter 4, a local domain name server of the proxy server network which contains a controller program 3, and a router for the proxy network 2 to connect to the internet 1. A similar set of hardware components exists for a purchaser web site server cluster 9 to connect to the internet 1. A brief description of this hardware is provided below.

Router 2 receives requests for information stored on the proxy network server cluster 5 from a remote location via the internet 1. Router 2 routes these requests, which typically comprise URL's, to the local domain name server of the proxy server network 3. The local domain name server of the proxy network 3 receives a URL from router 2 and resolves the domain name in the URL to a specific IP address in proxy server cluster 5.

Router 6 and local domain name server 7 perform the same tasks as Router 2 and domain name server 3, except that they are routing requests to a purchaser web site server cluster 9.

Packet filters 4 and 8 are generally found in most networks and serve as firewalls for the internal networks consisting of proxy network server cluster 5 and purchaser web site server cluster 9 respectively. All transactions into and out of an internal network are handled by the network's packet filter. Packet filters determine which services of the internal network may be accessed from the internet 1, which clients are permitted access to those services, and which outside services may be accessed by anyone on the internal network. Thus, packet filters 4 and 8 analyze data packets passing through them and filter those packets according to the settings on each network, restricting access where necessary and allowing access where appropriate.

The proxy network server cluster 5 and the purchaser web site server cluster 9 are both internal networks which are typically comprised of multiple servers. Sometimes these servers are all connected through a mainframe (or similar computer). The servers that make up each server cluster 5 and 9 are used to store files, such as website files, so that users may later access and view the files.

Figure 2:
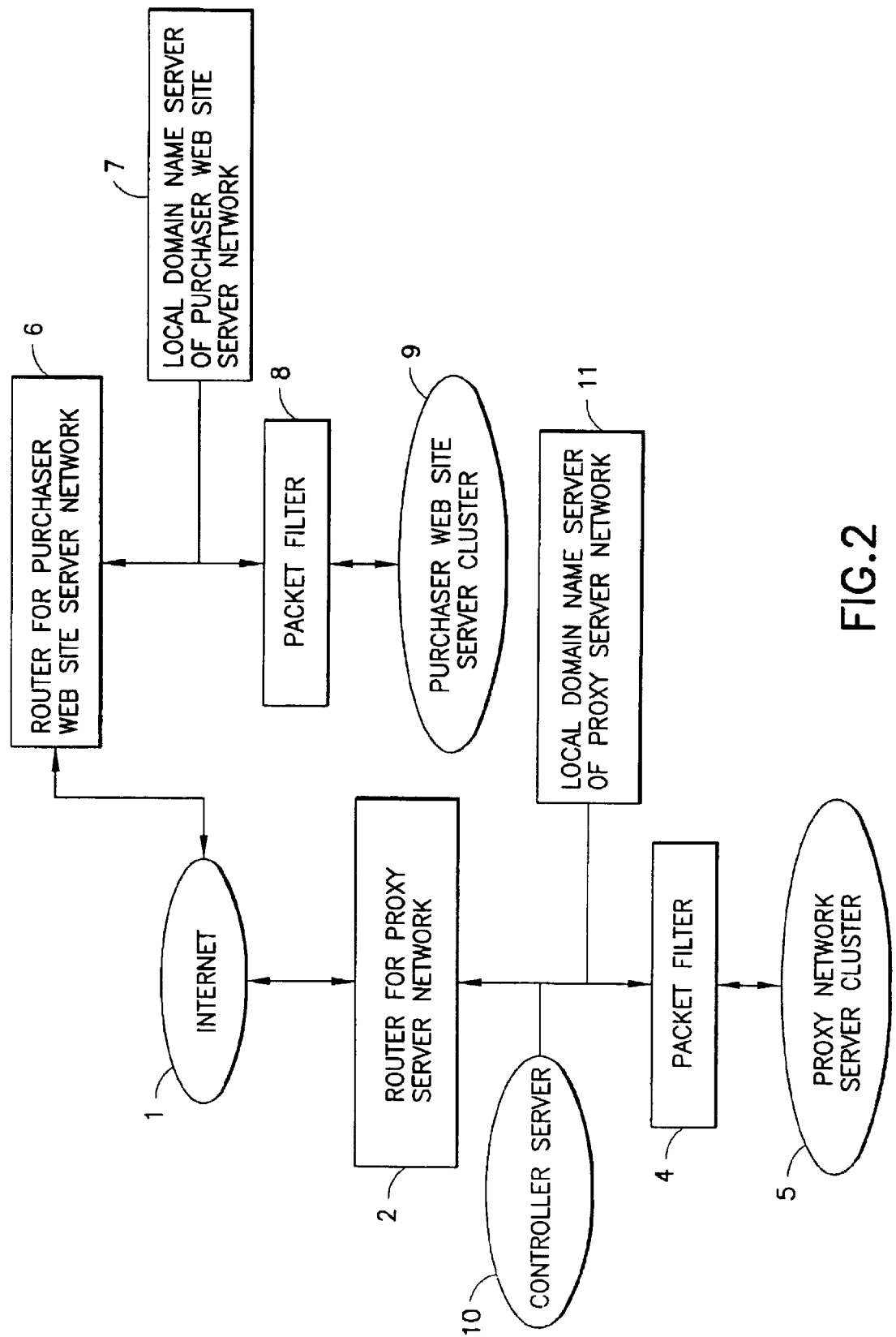
FIG. 2 is a hardware diagram illustrating the data flow of an alternative embodiment for the system and method to let a proxy network dynamically sell unused capacity.

FIG. 2 illustrates an alternate embodiment to the hardware structure depicted in FIG. 1. In FIG. 2, instead of storing the controller program on the local domain name server of the proxy network 3, the controller program is located on its own server 10 which is connected to the local domain name server 11.

Figure 3:
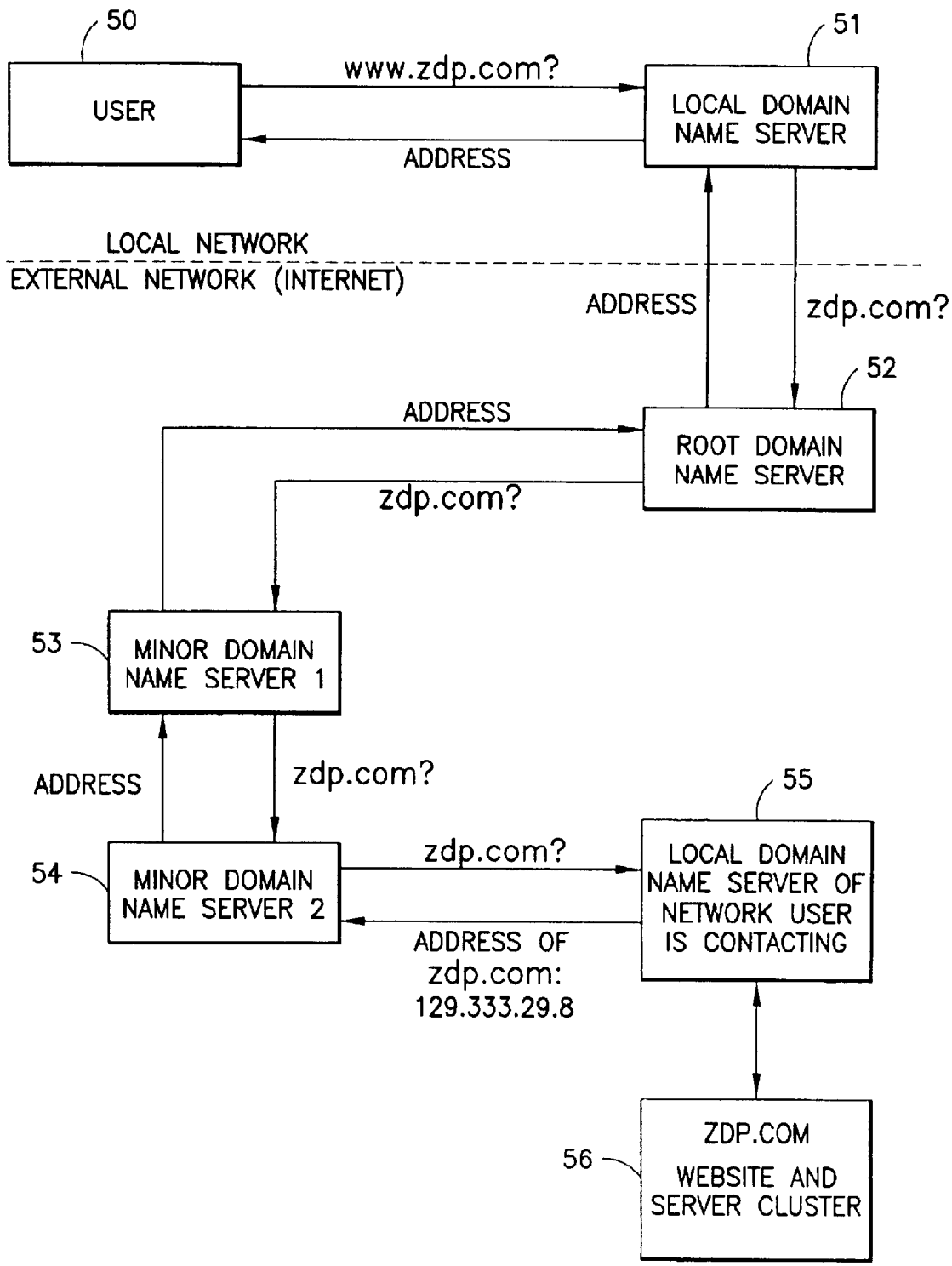
FIG. 3 is a block diagram illustrating a typical path taken by a user's request for a particular address on the internet, and the path taken in receiving that address.

FIG. 3 is a hardware diagram depicting the general path taken by a user's request for a particular address on the internet, and the path taken in receiving that address used in the prior art. A user 50 using a web browser requests a web site address using a URL. The URL is then sent to a local domain name server 51 on the user's 50 own local network. Domain name servers are responsible for resolving uniform resource locators or "URLs" (e.g., "www. .com") to specific internet or internet provider ("IP") addresses (e.g., 111.222.111.222). If the user 50 is requesting an address on the local network, the local domain name server 51 will have the corresponding internet address and will relay the internet address back to the user 50. The web browser of the user 50 will then take the user 50 directly to the requested site.

Otherwise, if the user 50 is not requesting a URL which corresponds to an IP address on the local network, the local domain name server 51 will not have corresponding IP address and the local domain name server 51 will have to contact a root domain name server 52 to get the information. If the root domain name server 52 does not have the IP address corresponding to the URL submitted by the user 50, then various minor domain name servers 53 and 54 will have to be contacted. If the minor domain name servers 53 and 54 don't have the internet address, the local domain name server 55 of the network 56 the user is contacting will be contacted to provide the IP address. However, often the minor domain name servers 53 and 54 will have the IP address to the URL requested by the user, and the local domain name server 55 of the network that the user is contacting will not have to be contacted.

Figure 4:
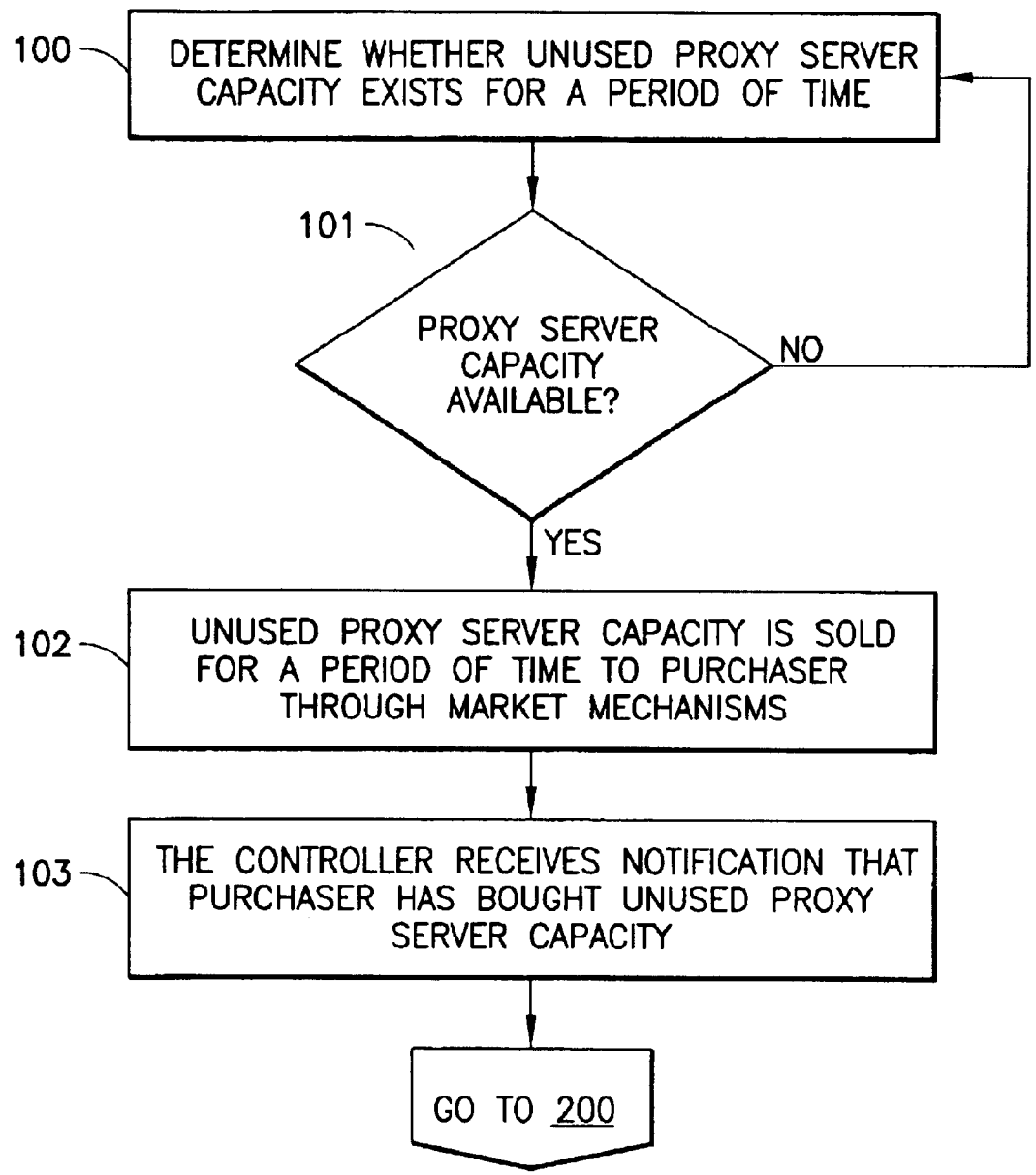
FIGS. 4–8 are flowcharts illustrating embodiments of the system and method to let a proxy network dynamically sell unused capacity.

FIG. 4 illustrates the initial process steps of the present invention for dynamically reconfiguring a proxy network to sell extra capacity to other networks, specifically WWW server networks. To begin, in steps 100 and 101 a determination must be made as to whether any unused proxy server capacity actually exists for a period of time which could be marketed to a web site operator. This determination can be made by a proxy network operator or by the controller program monitoring the proxy server network. The controller program is stored either on its own server 10 connected to the proxy server network, or on the local domain name server of the proxy server network 3.

Once it is determined that some unused proxy server capacity is available, step 102 follows where the unused proxy server capacity is marketed through various mechanisms known to persons skilled in the art. Some of the various ways in which the unused proxy server capacity can be marketed includes, but is not limited to, online auctions on the internet or on real-time continuous markets which are accessible via the internet. The unused proxy server capacity can also be sold either as an estimate (i.e., the proxy server network will use its best efforts to provide the capacity being sold and will possibly even supply additional capacity if it becomes available at a predetermined rate) or for a specific amount. In either case, the unused proxy server capacity will be sold to a purchaser for a limited, set time (i.e., the proxy server network will accept purchaser website's requests for four hours or for four hours on a daily basis). Payment for the purchase of proxy server capacity can be made through various mechanisms known to persons skilled in the art. For example, a credit card could be used or money could be wired from a specific account.

Figure 5:
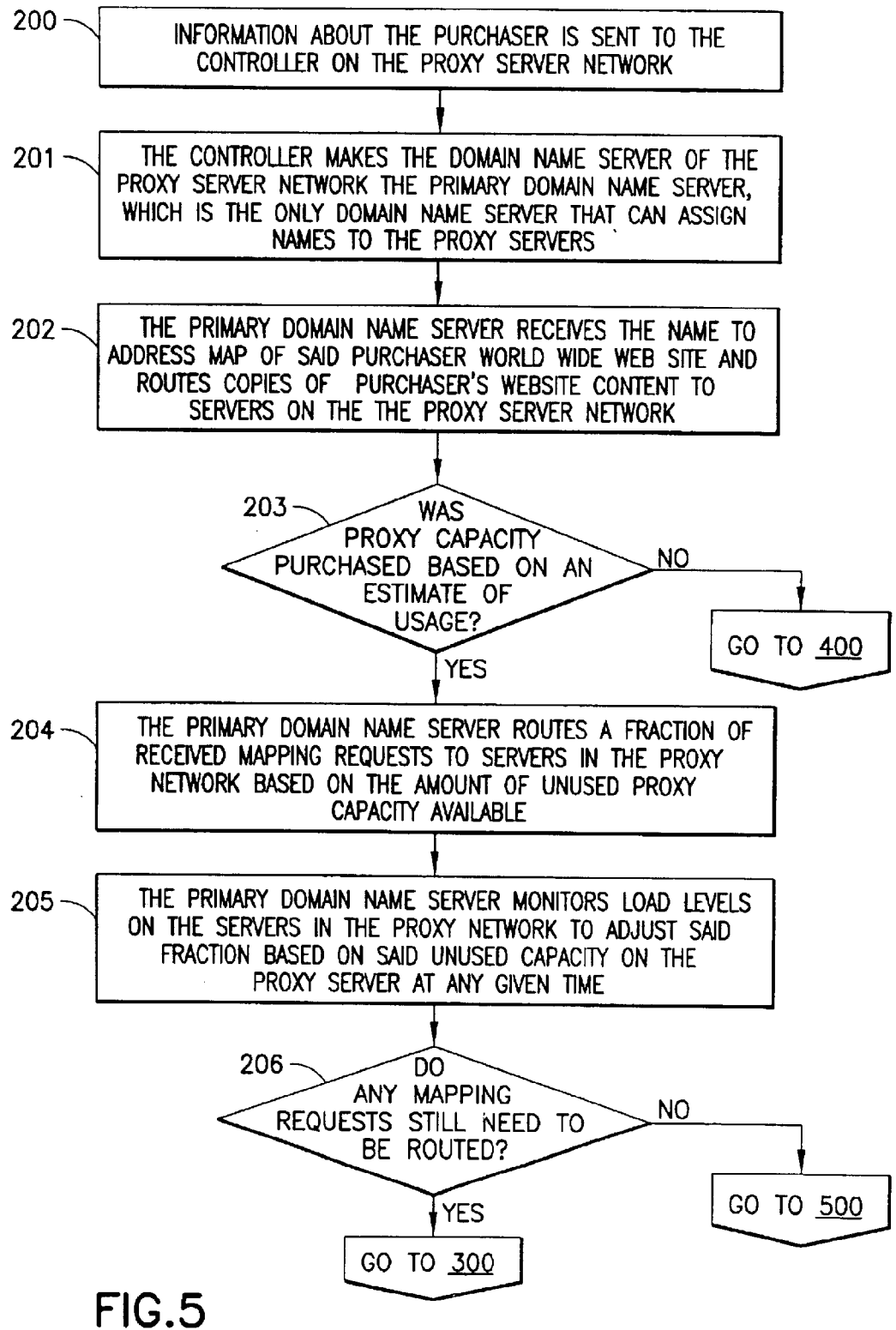

If some unused proxy server capacity is sold, step 103 then follows where the controller on the proxy server network is notified about the sale. Purchaser information is then sent to the controller in step 200 in FIG. 5. Such information includes, but is not restricted to, the purchaser's billing information such as credit card information, billing address, etc.

In step 201, the controller program ensures that the local domain name server of the proxy network is the primary domain name server, which is the only domain name server that can assign names to the proxy servers. As illustrated in FIG. 3, a user 50 who requests a website using a URL must have the URL mapped to a numerical IP address before accessing the actual website. However, often the user 50 does not have to contact the local domain name server of the network to get the IP address which corresponds to the URL the user 50 is requesting. In such cases, other minor domain name servers 53 and 54, which are outside the network, are able to provide the user 50 with the requested IP address. Step 201 ensures that local domain name server of the proxy network 55 will serve all naming requests. Therefore, the root domain name server 52 and minor domain name servers 53 and 54 will not be able to provide the user 50 with any name to address translations for the proxy server network. In this fashion, only the local domain name server 55 will have to be updated when proxy server network dynamically provides unused capacity.

In step 202, the primary domain name server receives the name to address map of the purchaser web site and routes copies of the purchaser's website content to servers on the proxy network. Therefore, the primary domain name server 3 handles all name to address translation requests for the purchaser website for the time that the purchaser has paid to use the proxy server capacity. The name to address map of the purchaser website can be obtained by the primary domain name server from the purchaser website's local domain name server. In addition it could be sent to the primary domain name server by a purchaser website operator along with an assignment algorithm or other mapping information the purchaser would like the proxy server network to know. The controller program would ensure that the information is received and handled appropriately.

In step 203, the controller program determines how to handle the mapping requests to the purchaser's website by examining whether or not the unused proxy capacity was purchased based on an estimate of usage. For example, if the original sale of the proxy server capacity was based on an estimate of unused capacity available, or if purchaser just wanted to purchase whatever unused proxy capacity existed, the controller program will have to initiate a steps 204 and 205 to route the mapping requests for the purchaser.

In step 204, the primary domain name server routes a fraction of the overall mapping requests for the purchaser website to servers in the proxy network based on the amount of unused proxy capacity available. In step 205, the primary domain name server monitors the load levels on the proxy servers to adjust the fraction of mapping requests for the purchaser website routed to proxy servers based on the amount of unused capacity available at any given time. This ensures that the proxy server network is never overburdened by the number of requests to the purchaser website. Thus, the dynamic sale of proxy capacity to other networks never interferes with the other operations of the proxy server network.

Figure 6:
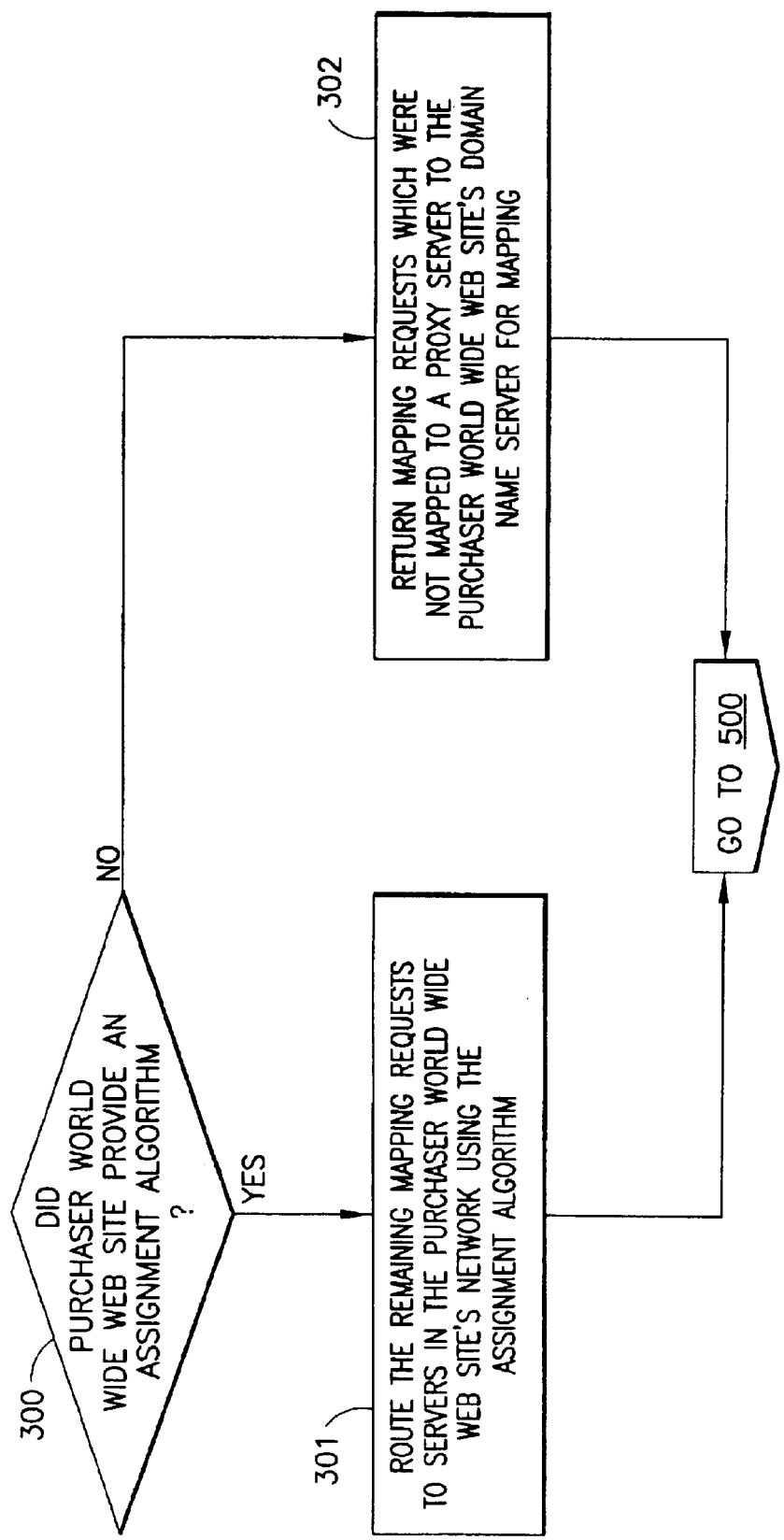
Figure 7:
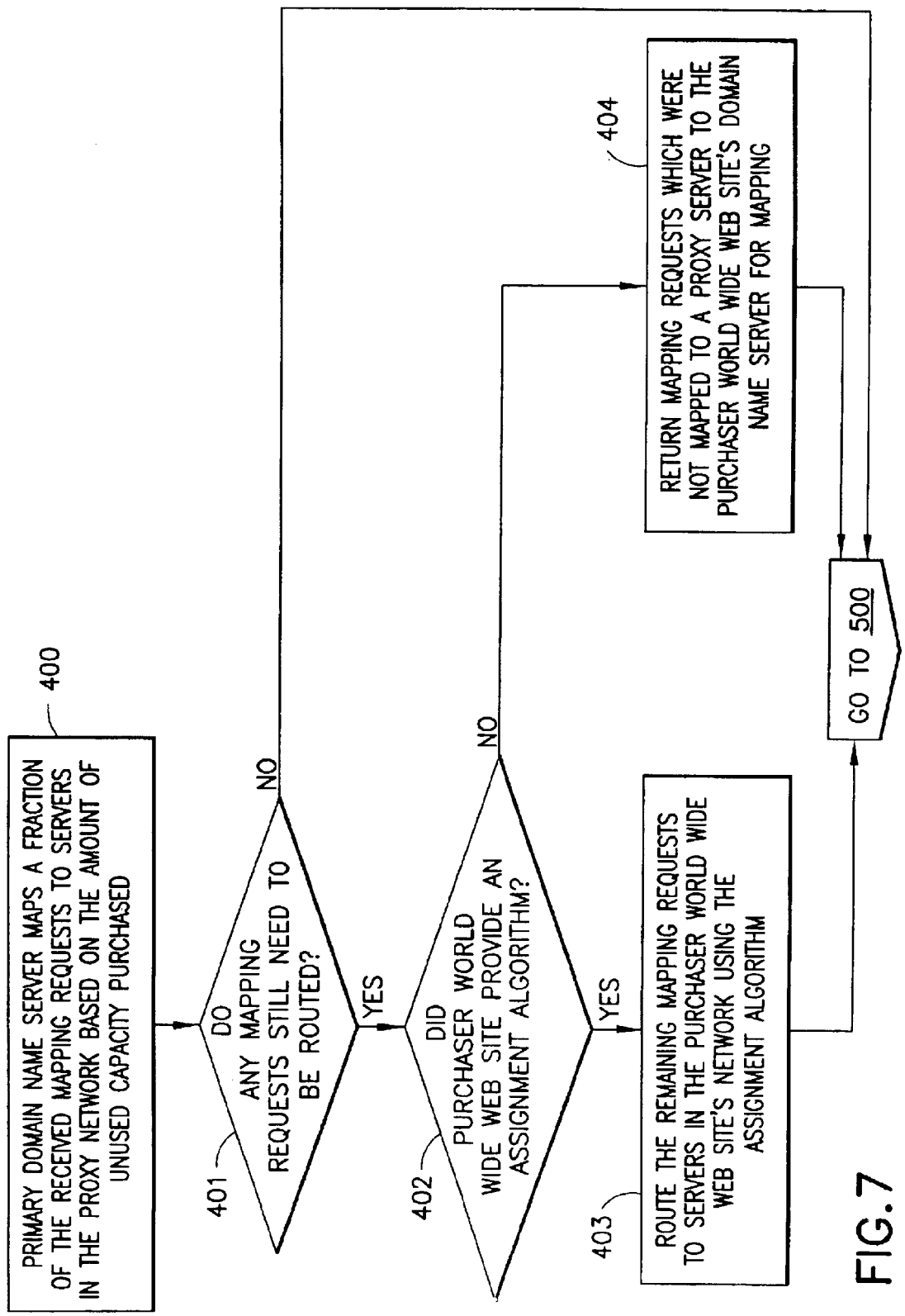

In step 206, the primary domain name server determines whether there are any mapping requests that cannot be routed to the proxy server due to a lack of proxy server capacity. If there are some, the primary domain name server next checks to see if the purchaser of the proxy capacity provided an assignment algorithm for handling these requests in step 300 in FIG. 6. If an assignment algorithm was provided, the primary domain name server routes all the mapping requests that the proxy network cannot handle to servers in the purchaser website's network in step 301. Otherwise, if an assignment algorithm was not provided, step 302 ensures that those mapping requests are returned to the domain name server of the purchaser website's network.

Figure 8:
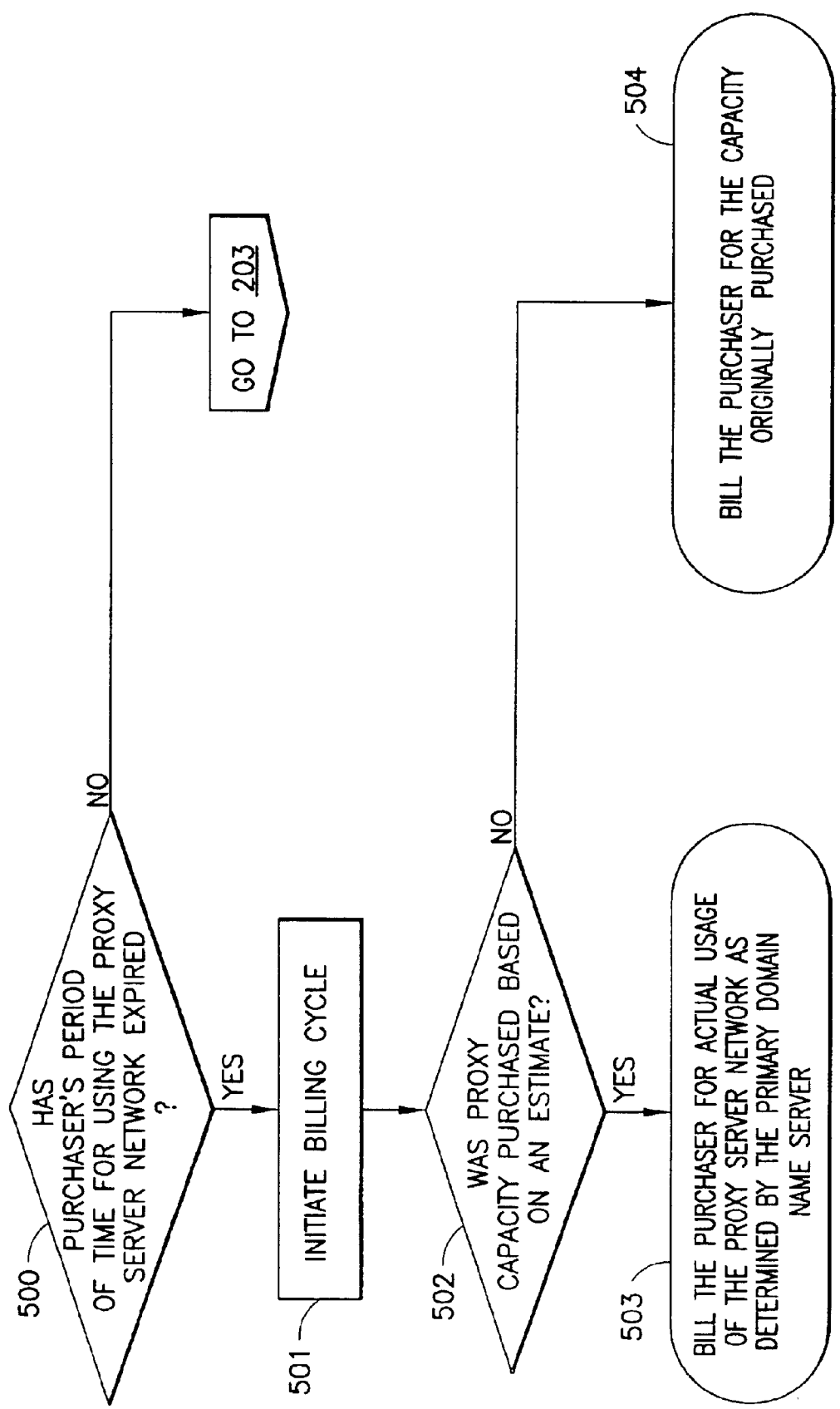

At this point, the controller program determines in step 500 in FIG. 8 whether the purchaser's period of time for using capacity on the proxy server network has expired. If it hasn't, the primary domain name server continues to map requests for the purchaser website. Otherwise, in step 501, a billing cycle is initiated. At this point, the controller program will determine whether or not to bill the purchaser a set amount or for the actual usage of the proxy network. If set amount of unused proxy capacity was originally purchased in step 102, the purchaser is billed the agreed upon amount as demonstrated in step 504. Otherwise, the purchaser is billed in step 503 for the overall actual usage of the proxy server capacity as determined by the controller program which monitored the purchaser's use of proxy capacity. At this point the controller program ends with regards to a particular purchaser, and begins step 100 to determine whether any unused proxy capacity is available.

Going back to step 203, if the purchaser did not buy proxy capacity based on an estimate, the primary domain name server will map a fraction of the received mapping requests to servers in the proxy network based on the actual proxy capacity purchased. Therefore, at no time will the amount of proxy capacity servicing mapping requests for the purchaser website's network be greater than the amount originally purchased. Additional mapping requests received by the primary domain name server which are not mapped by the primary domain name server because it would require more proxy capacity than was purchased, will be handled in steps 402, 403, and 404 in the same fashion as steps 300, 302, and 303 discussed above.

Finally, an alternative embodiment exists as shown by FIG. 2 where the controller program is stored on its own controller server 10. This server is then responsible for handling all of the mapping requests much like the local domain name server 3.

The above description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

What is claimed is:

1. A method for dynamically reconfiguring a proxy server network to deliver content by dynamically selling extra capacity, comprising the steps of:

determining unused capacity on the proxy server network for a period of time;

selling the said unused capacity for a specified period of time to web sites or other service providers which need additional capacity;

using said unused capacity to serve requests to the said web sites or other service providers purchasing the extra capacity for said period of time; and providing a controller to monitor and control traffic from the web sites or other service providers to be within a limit of the capacity purchased;

wherein said controller uses a domain name server based approach wherein the domain name server performs name to address mapping for assigning the request to proxy servers of the proxy server network;

wherein the said domain name server based approach makes the domain name server of the proxy server network a primary domain name server, which is the only domain name server that can assign names to the proxy servers; and wherein said domain name server based approach further comprises the steps of:

the domain name server of the purchaser World Wide Web site routing the name to address map of said purchaser World Wide Web site to said domain name server of the proxy network; and said primary domain name server mapping a fraction of the received mapping requests to servers in the proxy network based on an amount of unused capacity purchased.

2. The method of claim 1, wherein the selling method of the unused capacity can be through market-based mechanisms.

3. The method of claim 1, wherein mapping requests which were not mapped to servers in the proxy network are returned by said primary domain name server to said domain name server of the purchaser World Wide Web site to be mapped to a server of the purchaser's World Wide Web site.

4. The method of claim 1, wherein mapping requests which were not mapped to servers in the proxy network are assigned by said primary domain name server to servers in the purchaser World Wide Web site using an assignment algorithm provided by said domain name server of the purchaser World Wide Web site.

5. The method of claim 2, wherein said selling method consists of selling the unused proxy capacity through an auction.

6. The method of claim 2, wherein the selling method consists of selling the unused proxy capacity through a real-time continuous market.

7. The method of claim 1, wherein said controller sets the fraction of requests to be served by the proxy network, comprising the steps of:

setting an initial value based on a number provided by the purchaser World Wide Web site on the fraction of total requests needed to be routed to the proxy servers;

monitoring an actual number of World Wide Web object requests served by the proxy servers;

adjusting the fraction of World Wide Web object requests served so that the actual number of World Wide Web object requests served does not use more proxy server capacity than was purchased.

8. The method of claim 7, wherein the remaining object requests which were not served by the proxy server are returned to said domain name server of the purchaser World Wide Web site to be served by a server of the purchaser's World Wide Web site.

9. The method of claim 7, wherein the remaining object requests which were not served by the proxy server are assigned to servers in the purchaser World Wide Web site using an assignment algorithm provided by said domain name server of the purchaser World Wide Web site.

10. The method of claim 1, wherein said controller sets the fraction of requests to be served by the proxy network, comprising the steps of:

setting an initial value based on an estimate from the purchaser World Wide Web site on the fraction of total requests needed to be routed to the proxy servers;

monitoring the actual number of World Wide Web object requests served by the proxy servers;

adjusting the fraction of World Wide Web object requests served so that the actual number of World Wide Web object requests served does not use more proxy server capacity than was purchased.

11. The method of claim 10, wherein object requests which were not served by the proxy server are returned to said domain name server of the purchaser World Wide Web site to be served by a server of the purchaser's World Wide Web site.

12. The method of claim 10, wherein object requests which were not served by the proxy server are assigned to servers in the purchaser World Wide Web site using an assignment algorithm provided by said domain name server of the purchaser World Wide Web site.

13. A method for dynamically reconfiguring a proxy server network to deliver content by dynamically selling extra capacity, comprising the steps of:

determining unused capacity on the proxy server network for a period of time;

selling the said unused capacity for a specified period of time to web sites or other service providers which need additional capacity;

using said unused capacity to serve requests to the said web sites or other service providers purchasing the extra capacity for said period of time;

wherein said unused capacity can be based on an estimate of the usage of the proxy server network over time and said unused capacity can be provided based on the best efforts of the proxy server network;

and further comprising:

providing a controller to monitor and control the traffic from the purchaser to the proxy server network; and wherein said controller uses a domain name server based approach wherein the domain name server performs name to address mapping for assigning the request to proxy servers of the proxy server network;

wherein the said domain name server based approach makes the domain name server of the proxy server network a primary domain name server, such that no other domain name server can assign names to the proxy servers; and wherein said domain name server based approach comprises the steps of:

the domain name server of the purchaser World Wide Web site routing the name to address map of said purchaser World Wide Web site to said domain name server of the proxy network; and said domain name server of the proxy network mapping a fraction of received mapping requests to servers in the proxy network based on an amount of unused capacity on the proxy server available.

14. The method of claim 13, wherein said domain server of the proxy network monitors a load level on the proxy servers to adjust said fraction based on said unused capacity on the proxy server at any given time.

15. The method of claim 14, wherein mapping requests which were not mapped to servers in the proxy network are returned to said domain name server of the purchaser World Wide Web site to be mapped to a server of the purchaser's World Wide Web site.

16. The method of claim 14, wherein mapping requests which were not mapped to servers in the proxy network are assigned to servers in the purchaser World Wide Web site using an assignment algorithm provided by said domain name server of the purchaser World Wide Web site.

17. The method of claim 13, wherein a financial charge for the unused capacity will be based on the purchaser World Wide Web site's actual usage of the unused capacity.

18. Computer executable software code stored on a computer readable medium, the code for dynamically reconfiguring a proxy server network to deliver content by dynamically selling extra capacity, comprising:

code to determine unused capacity on the proxy server network for a period of time;

code to sell the said unused capacity for a specified period of time to web sites or other service providers which need additional capacity;

code to use said unused capacity to serve requests to the said web sites or other service providers purchasing the extra capacity for said period of time;

code to sell the unused capacity through market-based mechanisms;

code to monitor and control traffic from the web sites or other service providers to be within a limit of the capacity purchased;

code to use a domain name server based approach wherein the domain name server performs name to address mapping for assigning the request to proxy servers of the proxy server network;

code to make the domain name server of the proxy server network a primary domain name server, such that no other domain name server can assign names to the proxy servers;

code to make the domain name server of the purchaser World Wide Web site route the name to address map of said purchaser World Wide Web site to said domain name server of the proxy network; and code to make the primary domain name server map a fraction of the received mapping requests to servers in the proxy network based on the amount of unused capacity purchased.

19. A computer system for dynamically reconfiguring a proxy server network to deliver content by dynamically selling extra capacity, comprising:

a memory having at least one region for storing computer executable program code; and a processor for executing the program code stored in memory, wherein the program code includes:

code to determine unused capacity on the proxy server network for a period of time;

code to sell the said unused capacity for a specified period of time to sites or other service providers which need additional capacity;

code to use said unused capacity to serve requests to the said web sites or other service providers purchasing the extra capacity for said period of time;

code to sell the unused capacity through market-based mechanisms;

code to monitor and control traffic from the web sites or other service providers to be within a limit of the capacity purchased;

code to use a domain name server based approach wherein the domain name server performs the name to address mapping for assigning the request to proxy servers of the proxy server network;

code to make the domain name server of the proxy server network a primary domain name server, which is the only domain name server that can assign names to the proxy servers;

code to make the domain name server of the purchaser World Wide Web site route the name to address map of said purchaser World Wide Web site to said domain name server of the proxy network; and code to make the primary domain name server map a fraction of the received mapping requests to servers in the proxy network based on the amount of unused capacity purchased.

* * * * *